Aug. 9, 1966          J. R. TURUNEN           3,264,895
                      CONTROL LINKAGE
Filed May 8, 1963                       3 Sheets-Sheet 3

INVENTOR.
John R. Turunen
BY
A. M. Heiter
ATTORNEY

United States Patent Office 3,264,895
Patented August 9, 1966

3,264,895
CONTROL LINKAGE
John R. Turunen, Royal Oak, Mich., assignor to General Motors Corporation, Detroit, Mich., a corporation of Delaware
Filed May 8, 1963, Ser. No. 278,914
20 Claims. (Cl. 74—477)

This invention relates to a control linkage and more particularly to a gear selector linkage.

The invention provides a control system including a direct connection between a rotatable and axially movable control rod and a plurality of axially movable shift rails. There may also be included a universal joint between the hand lever controlled control rod and the transmission controlling control rod to damp vibration transmission to the hand lever and to permit aligning the hand lever controlled control rod with the steering column.

The preferred transmission control linkage is adapted for controlling a four speed and reverse synchromesh transmission in a vehicle having a front wheel drive with the power plant and transmission located transversely on the front wheel axis. A transmission control linkage, according to a preferred embodiment of this invention, employs a gear selector mechanism having a housing member detachably secured to the transmission and rotatably and slidably supporting one control rod. A shift lever extending through a slot in an interlock member connects the one control rod alternately and selectively to a first-second, a third-fourth and a reverse rail member. The rail members are supported on the housing member for movement transverse of the one control rod and individual shift forks for effecting transmission control are carried by the first-second and third-fourth rail members and operatively connected to the reverse rail member. The interlock member is supported on the housing member for movement transverse of movement of the rail members and permits movement of the shift lever through the slot to move a selected rail member and prevents movement of the non-selected rail members. Holding means on the rail members and supported on the housing member yieldingly hold the rail members in each of their positions.

In vehicles having the transmission located transversely in the forward end, the arrangement of the steering column relative to the transmission has been found to present a problem in that a unitary control rod connecting the hand lever on the steering column to the transmission is sometimes unsuitable to effect the linkage movements required to control the transmission and it is desirable to provide a connection that will not transmit vibration. For that reason, another control rod inclined relative to the steering column is coupled at one end by universal coupling means to the one control rod and pivotally connected at the other end to a hand lever which is pivotally supported on the steering column. Selective pivotal movement of the hand lever relative to the steering column acts through another control rod and universal coupling means to transmit rotary and sliding movements to the one control rod to effect gear selection.

Biasing means normally urge the one control rod to a position corresponding to selection of the third-fourth rail member and provides a low force resisting movement of the one control rod to a position corresponding to selection of the first-second rail member and a high force abruptly resisting initial movement of the one control rod to a position corresponding to selection of the reverse rail member. Since pulling force on the one control rod to effect selection of the different rail members is required in only one direction, upward, the universal coupling means need only be capable of transmitting a pulling force in one direction.

An object of this invention is to provide an improved and simplified transmission control linkage.

Another object is to provide an improved and simplified gear selector mechanism adapted to be secured as a unit to a transmission.

Another object is to provide in a gear selector mechanism improved and simplified coupling means for coupling together a pair of control rods.

Another object is to provide in a gear selector mechanism improved and simplified biasing means for resisting movement of a control rod to one selecting position with a low force and resisting further initial movement of the control rod to another selecting position with an abruptly high force.

Another object of the invention is to provide in a transmission control linkage, a direct interlocked connection between a lever on a rotating and reciprocating control rod and a plurality of axailly reciprocating shift rails located in a transmission housing carrying shift forks operative to move the ratio selecting elements.

These and other objects of the invention will be more apparent from the following description and drawings of the preferred embodiments of the invention.

This transmission control linkage is adapted to control four speed and reverse synchromesh transmissions where the transmission is located transversely in the front end of a vehicle such as in the manner shown in Christie Patent No. 896,624, Williams Patent No. 926,797 and Leggett Patent No. 1,093,277. An example of a four speed and reverse synchromesh transmission with which this transmission control linkage may be employed is shown in the Fodrea application S.N. 134,919, filed August 30, 1961, now Patent No. 3,192,788.

Figures 1, 2, 3:
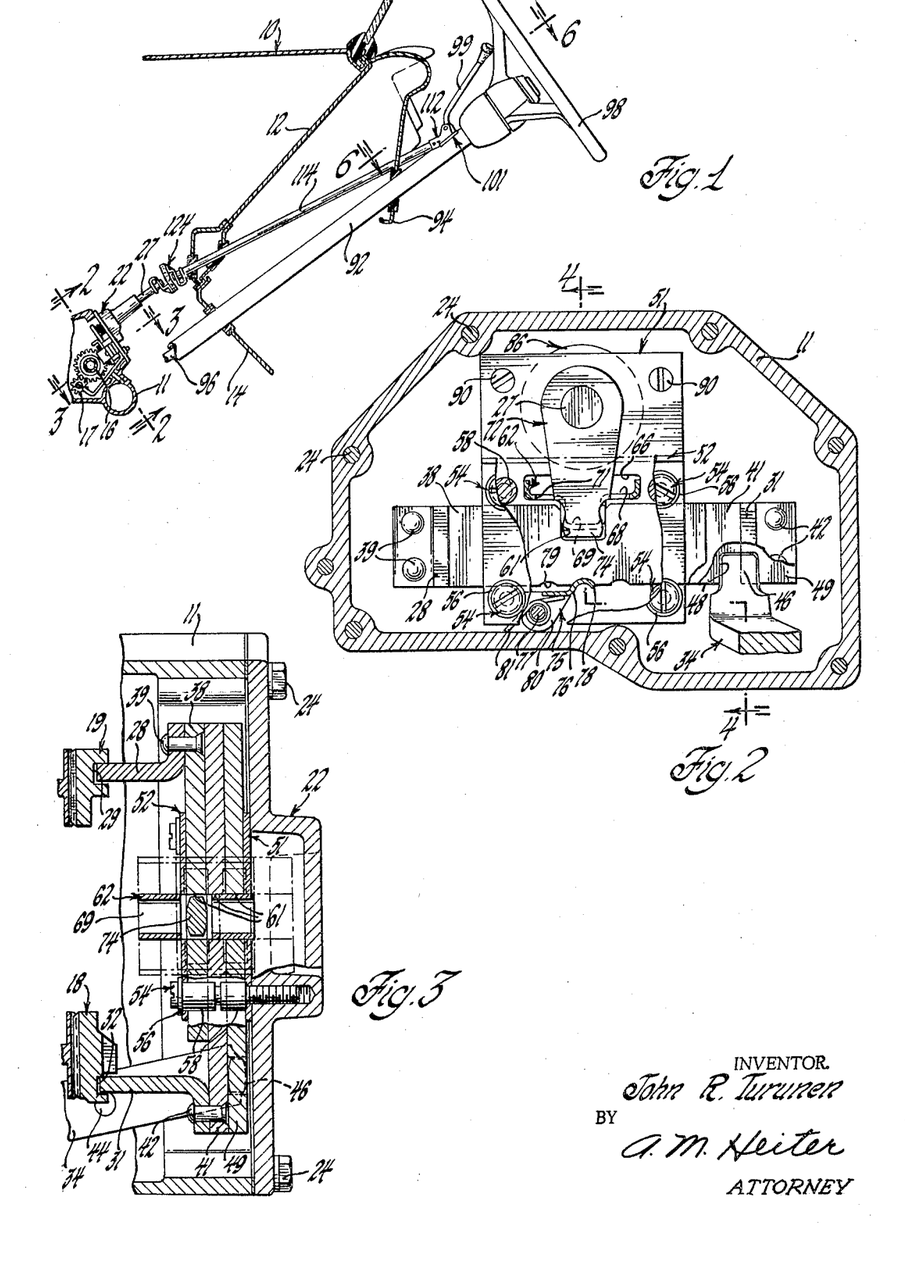
FIGURE 1 is an elevational view of the transmission control linkage.
FIGURE 2 is an enlarged section of FIGURE 1 on the line 2—2.
FIGURE 3 is an enlarged section of FIGURE 1 on the line 3—3.

Referring to FIGURE 1, the transmission having a housing 11 is located transverse of the vehicle 10 and forward of the fire wall 12 and toe board 14.

As best shown in FIGURES 1–4, the transmission has multiratio drive means including a pair of shafts 16 and 17. Shaft 16 carries controlled means movable for effecting a change in forward drive ratio comprising a first-second sliding gear 18 and a third-fourth sliding gear 19, and shaft 17 carries controlled means movable for effecting reverse drive ratio comprising a reverse sliding gear 21. The shafts and gear arrangements may be seen in greater detail in the above-noted Fodrea application S.N. 134,919, now Patent No. 3,192,788.

A gear selector mechanism having a housing support member 22 is detachably secured to housing 11 by bolts 24 and has a bore 26 rotatably and slidably supporting a transmission controlling control rod 27. The gear selector mechanism has a third–fourth shift fork 28 received in an annular groove 29 in gear 19, a first–second shift fork 31 received in an annular groove 32 in gear 18, and a reverse shift fork 34 received in an annular groove 36 in gear 21. Shift fork 28 is connected to a third–fourth shift rail member 38 by rivets 39, shift fork 31 is connected to a first–second shift rail member 41 by rivets 42, and shift fork 34 is pivoted to housing 11 by pivot pin 44 and has a tongue 46 received in a recess 48 in the lower edge of a reverse shift rail member 49.

Rail members 38, 41 and 49 are mounted side by side and between upper and lower guide plate members 51 and 52 respectively which are parallel to each other and to the shafts 16 and 17. Bolts or threaded securing members 54 secure guide plate members 51 and 52 together and to housing member 22 and are disposed adjacent the upper and lower edges of the rail members. Securing members 54 have annular grooves retaining snap rings 56 which abut the lower face of guide plate member 52 and a pair of lands 58 to hold the guide plate members in spaced relationship to each other. Lands 58 contact the upper and lower edges of the rail members and provide, in conjunction with the guide plate members, supporting means supporting each rail member for reciprocal movement transverse of the control rod 27 and between their neutral position as shown in FIGURE 3 and their respective shift positions.

Shift fork 28 and rail member 38, and shift fork 31 and rail member 41 provide independent controlling means operable upon reciprocal movement laterally of shaft 16 to move the sliding gears which they engage between their neutral and respective forward gear selecting positions. While the above shift forks and rail members have been shown to be riveted together, these components may also be secured together by other suitable means such as by bolting or welding, or the shift fork and rail member may be of one piece construction. The rail member 49 is operable upon reciprocal movement laterally of shaft 17 to engage tongue 46 of shift fork 34 and laterally pivot shift fork 34 relative to shaft 17 to move the reverse sliding gear between its neutral and reverse gear selecting position.

Figures 4, 5, 6, 7:
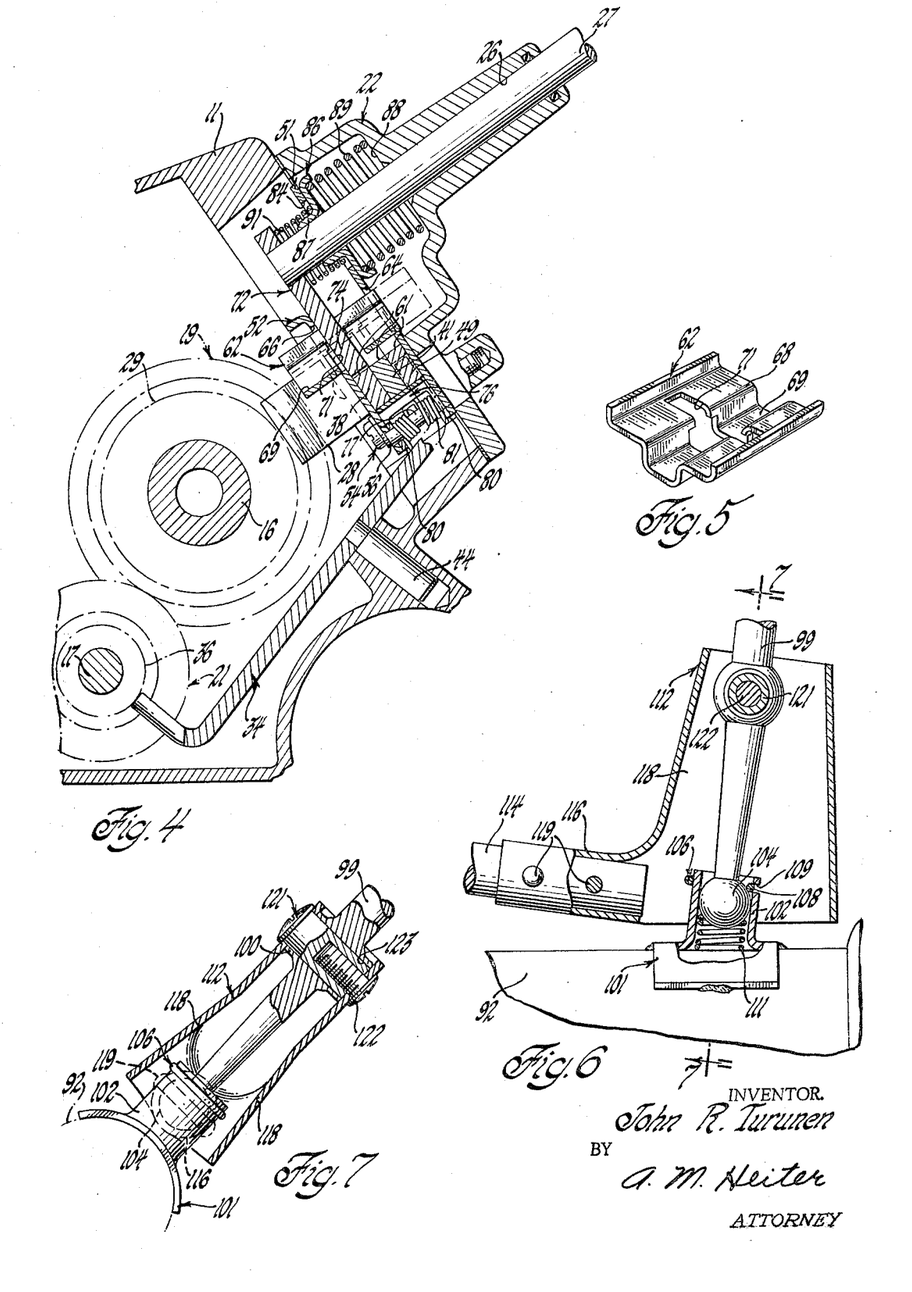
FIGURE 4 is a section of FIGURE 2 on the line 4—4.
FIGURE 5 is a perspective view of the interlock member.
FIGURE 6 is an enlarged view of the hand lever assembly of FIGURE 1 on the line 6—6.
FIGURE 7 is a section of FIGURE 6 on the line 7—7.

Each rail member has a central recess 61 in its upper edge and the recesses 61 are alignable with each other when the rail members are in their neutral position as best shown in FIGURES 2–4. An interlock member 62 as best shown in FIGURE 5 is slidably received in aligned apertures 64 and 66 in guide plate members 51 and 52 respectively for reciprocal movement transverse to movement of the rail member. The interlock member 62 has a double channel cross section and comprises an elongated channel shaped base portion 68, a longitudinal channel shaped center portion 69, and an elongated slot 71 extending through and transversing across the base portion 68 and center portion 69.

The center portion 69 of the interlock member 62 fits within the recesses 61 of the rail members and a shift lever 72 secured, as by welding, to the lower end of control rod 27 extends through slot 71 and has an operating end portion 74 alternately and selectively receivable in the recesses 61 of the rail members upon sliding movement of the control rod 27.

Upon sliding movement of the control rod 27 to a selecting position corresponding to one of the rail members, the shift lever 72 contacts one of the side walls of the slot 71 to move the interlock member 62 conjointly with the control rod 27 to the desired selecting position to position the center portion 69 in the recesses of the non-selected rail members and align the slot 71 with the selected rail member. In each of the selecting positions, the control rod 27 may be rotated to swing the shift lever 72 in the slot 71 and the selected rail member will thus be moved by the operating end portion 74 from its neutral position to its respective shift positions through the slot 71. The non-selected rail members cannot be moved because the side walls of their recesses engage a non-slotted portion of center portion 69.

A detent member 75 having a main body portion 76 and spaced parallel legs 80 is rotatably supported on a pin 77 passing through aligned apertures in legs 80. The pin 77 is received and retained in aligned apertures in guide plate members 51 and 52. Detent member 75 has a curved portion 78 receivable in recesses 79 in the lower edges of the rail members and a spring member 81 wrapped about pin 77 and tensioned or biased between one of the securing members 54 and the main body portion 76 of detent member 75 urges the detent member 75 to pivot counterclockwise about pin 77 as viewed in FIGURE 2 and the curved portion 78 against the lower edges of the rail members. The recesses 79 of the rail members correspond to the neutral and shift positions of each of the rail members and the detent member 75 acts to yieldingly hold the rail members in their neutral and shift positions so that the operator can determine the positions of the rail members by feel.

Control rod 27 extends through an aperture 84 in the upper portion of guide plate member 51 and an abutment or spring seat member 86 having an annular flange portion 87 slidably received on control rod 27 is disposed between an inside wall 88 of housing member 22 and guide plate member 51 and is abuttable with guide plate member 51 as shown. A large coil spring 89 surrounding control rod 27 is in abutting relationship at its opposite ends with inside wall 88 and the upper face of abutment member 86. Spring 89 has a high spring force and is prestressed to urge abutment member 86 against the upper face of guide plate member 51. A pair of bolts 90 firmly secure the upper portion of guide plate member 51 to housing member 22 to prevent bending of the guide plate member 51. A small coil spring 91 surrounding control rod 27 is in abutting relationship at its opposite ends with the lower face of abutment member 86 and the upper face of shift lever 72. Sufficient radial clearance is provided between flange portion 87 of abutment member 86 and coil spring 91, and between coil spring 91 and the side wall of aperture 84 so that there is no rubbing between these parts. Spring 91 which has a low spring force is prestressed and springs 89 and 91 cooperatively bias control rod 27 to the lower position as best shown in FIGURE 4 to urge the lower face of shift lever 72 against the upper face of guide plate member 52 so that the operating end portion 74 of shift lever 72 is received in the recess of the third–fourth shift rail member 38.

Upon upward movement of control rod 27 to a selecting position corresponding to the first–second shift rail member 41, only spring 91 is compressed since the force required to effect this movement is not large enough to relieve the prestressing of spring 89 and spring 91 provides a low force resisting this movement. On further upward movement of control rod 27 to a selecting position corresponding to the reverse shift rail member 49, the upper face of shift lever 72 engages the lower end of the flange portion 87 of abutment member 86 so that this movement is resisted by spring 89 which has a high spring force. Before spring 89 can be compressed and the control rod 27 moved fully to the reverse selecting position, the upward force on the control rod 27 must be of sufficient magnitude to overcome the stored force in spring 89 which results from the prestressed condition of spring 89. This stored force must be overcome during initial movement of control rod 27 to the reverse selecting position and prior to movement of the control rod 27 fully to the reverse selecting position and thus provides an abrupt resisting force and a pronounced detent feel which is sensed by the operator and acts to prevent inadvertent shifts to reverse.

A stationary steering column 92 adaptable to be fixed to the chassis of the vehicle extends through and is supported by the dash board 94 and toe board 14. A steering shaft 96 internal of and rotatably supported by the steering column 92 has fixed to its upper end a steering wheel 98. Below the steering wheel is a manual shift or hand lever 99 swivelly mounted on the steering column by a bracket member 101 as best shown in FIGURES 6 and 7. Bracket member 101 is secured to the steering column 92 as by welding and has an integral tubular portion 102 extending at a right angle from the steering column. The hand lever 99 has a ball portion 104 closely fitting within the tubular portion 102 and retained therein by a C-type spring clip 106 which has a leg or retaining portion 108 received in a slot 109 in the tubular portion 102. A coil spring 111 is mounted in the tubular portion 102 and has its opposite ends in abutting relationship with the steering column 92 and the ball portion 104. Spring 111 is prestressed and yieldingly holds ball portion 104 against the leg portion 108 of spring clip 106.

A lever housing 112 pivotally connects the hand lever 99 to a hand lever controlled control rod 114 and includes a tubular portion 116 and side walls 118. The tubular portion 116 is received on the upper end of control rod 114 and secured in place as by rivets 119. An internally threaded pivot pin 121 is received in aligned apertures in side walls 118 and retained in position by bolt 122. Hand lever 99 has an enlarged portion 100 faced to abut the side walls 118 intermediate its two ends having an aperture 123 receiving the pivot pin 121 whereby the hand lever 99 and control rod 114 can only move relative to each other about the axis of the pivot pin 121. The spacing between aperture 123 and the center of ball portion 104, and between the aperture 123 and the axis of control rod 114 are equal so that the axis of control rod 114 will intersect the center or pivot point of ball portion 104 during all movements of the hand lever. The lever housing 112 upon lateral pivotal movement of the hand lever about its ball end relative to the steering column moves laterally with the hand lever and imports lateral movement to the control rod 114 and upon transverse pivotal movement of the hand lever about its ball end relative to the steering column moves with the hand lever and imparts rotary movement to the control rod 114. Control rod 114 is inclined relative to the steering column 92 and control rod 27 to accommodate for the offset between the axis of control rod 27 and the pivotal connection between the hand lever and steering column and a universal coupling or joint 124 couples the upper end of control rod 27 to the lower end of control rod 114.

In the above described gear selector mechanism only an upward pulling force is required to move the control rod 27 progressively from its neutral third–fourth to its first–second and reverse selecting positions since the springs 89 and 91 provide a downward pushing force on the control rod 27 to return it from its reverse and first–second selecting positions to its normal third–fourth selecting position. In addition by referring to FIGURE 2, it will be observed that it is only necessary to rotate the control rod 27 through a small arc to effect movement of the rail members between their neutral and shift positions.

Figure 8:
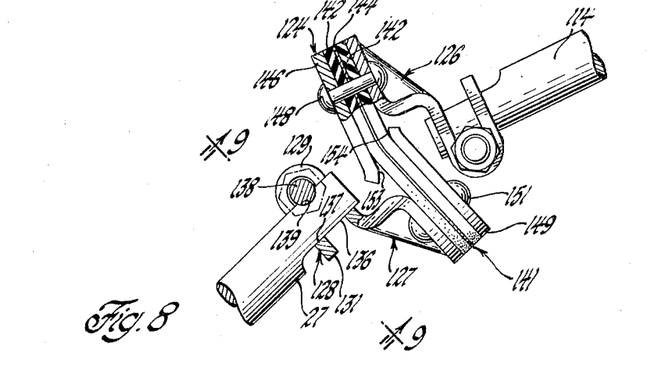
FIGURE 8 is an enlarged elevational view of the universal coupling of FIGURE 1.
Figure 9:
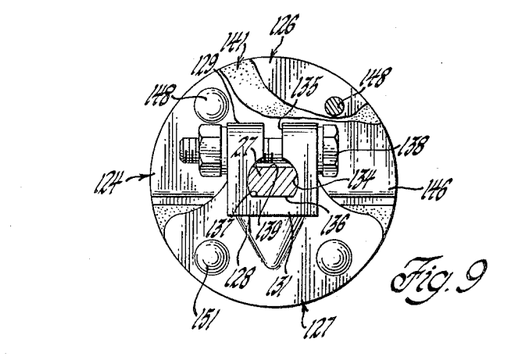
FIGURE 9 is a section of FIGURE 8 on the line 9—9.
Figure 10:
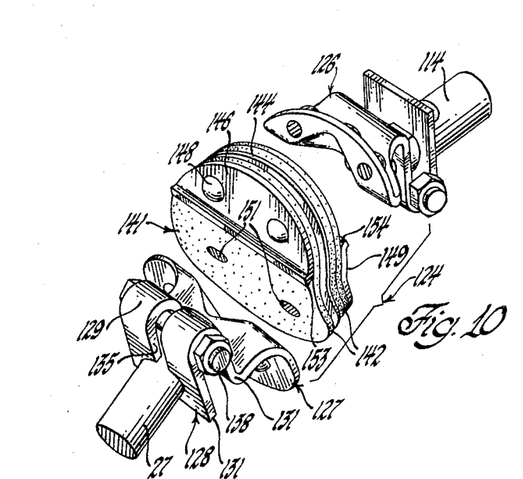
FIGURE 10 is an exploded view of the universal coupling.

Since it is only necessary that the universal joint 124 transmits upward pulling forces and the control rod 27 travels through only a small arc in effecting transmission control, it is only necessary that the universal coupling employed meet these minimum requirements. As best shown in FIGURES 8–10, the universal joint 124 is comprised of a pair of identical coupling or flange members 126 and 127 adapted to be secured to the control rods 114 and 27 respectively. Each flange member such as flange member 127 has a tongue portion 128 looped to form a bight or bend 129 and spaced parallel legs 131. Legs 131 have aligned apertures in the shape of partial circular openings 134 having a diameter slightly larger than that of the control rod to which it is adapted to be connected, in this instance control rod 27. To insure against relative rotation between the control rod and flange member the end of each control rod, such as control rod 27, is provided with a flat 136 which is engaged by a flat side wall portion 137 of the openings 134. The tongue portion 128 is slotted inwardly from the bend 129 into the openings 134 by a slot 135 to divide the legs into opposed jaw portions. Each flange member, such as flange member 127, has a bolt 138 received in the bight 129 and in a notch 139 provided in the ends of the control rods. Upon tightening of the bolt 138, the jaw portions of the flange member are brought closer together to tightly grip the control rod. The notch 139 insures against lateral movement of the bolt 138 and the flange member 127 along the control rod.

A flexible disc assembly 141 interconnects the flange members 126 and 127 and comprises a pair of discs 142 of woven material and a center disc 144 of thin spring steel which insures accurate rotary torque transmissions.

As best shown in FIGURES 8 and 10, the flange members 126 and 127 are opposite each other and rotated 180° apart and a clamping member 146 secured to the flange member 126 by suitable rivets 148 and an identical clamping member 149, 180° apart from clamping member 146, secured to the flange member 127 by suitable rivets 151 hold the flexible disc assembly 141 in position to transmit drive from one flange member to the other.

The clamping members 146 and 149 are partially circular to conform to the discs 142 and 144 and are slightly larger than a semi-circle having curved portions 153 and 154 respectively extending chordally thereacross. The curved portions 153 and 154 are curved outwardly from the opposite sides of the flexible disc assembly 141 and overlap sufficiently so that an outward or pulling force on the universal joint is transmitted through the universal joint from one control rod to the other. Thus, the control rods move conjointly when there is a pulling force on the universal joint. If there is applied a pushing force on the universal joint by one control rod, the discs 142 and 144 may bend prior to the transmittal of a force sufficient to move or push the other control rod. The joint does not transmit vibration due to engine transmission movement on its vibration damping mounting. Since the gear selector mechanism described above requires only a pulling force on control rod 27 to effect gear selector mechanism operation, the above universal joint is suitable for that purpose.

Since the curved portions 153 and 154 of the clamping members overlap, the bending of the flexible discs 142 and 144 occurs at two different points depending on the direction of bending. When the universal joint is rotated through a full 360°, this varying of the bending points acts to prolong the life of the joint since the bending stresses are better distributed than if there were only one point about which the discs bent. As viewed in FIGURE 8, the flexible disc assembly as shown bent about curved portion 154 and upon rotation of the universal joint through 180°, the flexible disc assembly will gradually alternate from bending about curved portion 154 to bending about curved portion 153. As the control rods and the universal joint rotate, the axes of the control rods intersect at a point within the flexible disc assembly and establish a virtual center about which rotation takes place.

Since the above universal joint is in the nature of a hinged joint construction, upon rotation in either direction from the position shown there will occur twisting of the flexible disc assembly in addition to bending of the flexible disc assembly about curved portions 153 and 154. This twisting of the flexible disc assembly will act to pull the control rods toward each other and this twisting increases as the universal joint is rotated in either direction until it reaches a maximum which occurs at 90° rotation of the universal joint from the position shown in FIGURES 8 and 9 and thereafter decreases as the universal joint is continued to be rotated in the same direction until it reaches zero which corresponds to 180° rotation of the universal joint from the position shown in FIGURES 8 and 9. Upon further rotation in the same direction, the flexible disc assembly which is then bent only about curved portion 153 again twists with the twist increasing until it reaches a maximum at 270° rotation and thereafter diminishes to zero at 360° rotation where the cycle is completed.

Since the control rod 27 is rotated through only a small arc much smaller than 90°, as best shown in FIGURE 2, to move the rail members in either direction from their neutral position to their shift positions, the universal joint 124 is only required to be rotated through a corresponding small arc to effect the different shifts. Since the universal joint is initially in the position shown in FIGURES 8 and 9 which corresponds to neutral and the control rod 27 and joint 124 are rotated through only a small arc to effect the different shifts, the twisting of the flexible disc assembly will vary between zero in neutral and some very small amount in the different shift positions. Since this twisting is very small the pulling together of the control rods is negligible and does not affect the operation of the gear selector mechanism. The above joint provides a simplified and inexpensive universal joint or coupling to couple a pair of inclined control rods and readily lends itself to mass production.

The transmission control operates to provide the several drive ratio selections upon selective swinging movements of the hand lever. With the transmission controlling control rod 27 normally biased by the springs 89, 91 to third–fourth selecting position as shown, selective transverse swinging movement of the hand lever is transmitted through the hand lever controlled rod 114, the universal joint 124 to rotate the controlling control rod to effect either third or fourth drive ratio in the transmission. For either first or second drive ratio the hand lever is swung laterally upward and the controlled control rod acting through the universal joint moves the controlling control rod upwardly along its axis compressing spring 91 until the first–second selecting position is reached. Then upon selected transverse swinging movement of the hand lever either first or second drive ratio is effected by rotational movements transmitted by the controlled control rod and universal joint to the transmission controlling rod. For reverse, the hand lever is further swung laterally upward and the controlled control rod acting through the universal joint moves the controlling control rod against the bias of spring 89 to the reverse selecting position where transverse swinging movement of the hand lever is effective through the controlled control rod, universal joint and controlling control rod to condition the transmission for reverse. When the hand lever is returned to neutral in either the reverse or first–second selecting position, upon the operator's release of the hand lever the springs 89, 91 are effective to return the controlling control rod to the third–fourth selecting position. The controlling control rod then acting through the universal joint returns the controlled control rod and hand lever to their normal positions as shown.

The above-described preferred embodiment is illustrative of the invention which may be modified within the scope of the appended claims.

I claim:
1. In a transmission the combination of,
   (A) support means,
   (B) control means rotatably and slidably mounted in said support means,
   (C) controlling means,
   (D) means supporting said controlling means on said support means for reciprocal movement transverse of said control means between a plurality of positions,
   (E) said control means being slidably movable to a selecting position corresponding to said controlling means,
   (F) and means operatively connecting said control means to said controlling means in said selecting position to move said controlling means between its plurality of positions when said control means is rotated.

2. In a transmission the combination of,
   (A) housing means,
   (B) multiratio drive means mounted in said housing means having controlled means movable for effecting a change in drive ratio,
   (C) control means rotatably and slidably mounted in said housing means,
   (D) controlling means for controlling a transmission,
   (E) means supporting said controlling means on said housing means for reciprocal movement transverse of said control means between a plurality of positions,
   (F) said control means being slidably movable to a selecting position corresponding to said controlling means,
   (G) and means operatively connecting said control means to said controlling means in said selecting position to move said controlling means between its plurality of positions when said control means is rotated.

3. In a transmission as defined in claim 2 and said housing means including separate support housing means secured thereto in which said control means is mounted.

4. In a transmission as defined in claim 2 and said housing means including separate support housing means secured thereto on which said controlling means is supported.

5. In a gear selector mechanism of a character adapted to be secured to a transmission the combination of,
   (A) support means,
   (B) control means rotatably and slidably mounted in said support means,
   (C) a plurality of shift fork means,
   (D) supporting means supporting each shift fork means on said support means for reciprocal movement transverse of said control means between a plurality of positions,
   (E) said control means being slidably movable to a selecting position corresponding to each shift fork means,
   (F) means operatively connecting said control means to one shift fork means in each selecting position of said control means to move one shift fork means between its plurality of positions when said control means is rotated,
   (G) and means slidably movable in said supporting means conjointly movable with said control means to each selecting position and operable in each selecting position to prevent movement of the non-selected shift fork means.

6. In a gear selector mechanism of a character adapted to be secured to a transmission the combination of,
   (A) support means,
   (B) control means rotatably and slidably mounted in said support means,
   (C) a plurality of shift fork means,
   (D) supporting means supporting each shift fork means on said support means for reciprocal movement transverse of said control rod means between a plurality of positions,
   (E) said control means being slidably movable to a selecting position corresponding to each shift fork means,
   (F) means operatively connecting said control means to one shift fork means in each selecting positions to move one shift fork means between its plurality of positions when said control means is rotated,
   (G) locking means slidably mounted in said supporting means conjointly movable with said control means to each selecting position,
   (H) said plurality of shift fork means having lock means selectively co-operatively with said locking means in each selecting position to lock the non-selected shift fork means in one of their positions, (I) and means on said supporting means and shift fork means to yieldingly hold said shift fork means in each of their positions.

7. In a gear selector mechanism of a character adapted to be secured to a transmission the combination of, (A) support means, (B) control means rotatably and slidably mounted in said support means, (C) a plurality of shift fork means, (D) supporting means supporting each shift fork means on said support means for reciprocal movement transverse of said control means between a plurality of positions, (E) said control means being slidably movable to a selecting position corresponding to each shift fork means, (F) means providing a force resisting movement of said control means to said selecting positions and operative to provide an abruptly increased force resisting initial movement of said control means to one of said selecting positions, (G) lever means operatively connecting said control means to one shift fork means in each selecting position to move one shift fork means between its plurality of positions when said control means is rotated, (H) locking means operatively connected to said control means by said lever means and slidably mounted in said supporting means for movement transverse of the movement of said plurality of shift fork means and conjointly with said control means, (I) lock means on said plurality of shift fork means selectively co-operable with said locking means in each selecting position to lock the non-selected shift fork means in one of their positions, (J) and holding means on said supporting means and plurality of shift fork means to yieldingly hold said plurality of shift fork means in each of their positions.

8. In a gear selector mechanism of a character adapted to be secured to a transmission the combination of, (A) support means, (B) control means rotatably and slidably mounted in said support means, (C) a plurality of shift fork members, (D) an independent rail member operatively connected directly to each shift fork member, (E) supporting means including a pair of spaced guide member secured to each other and to said support means by a plurality of securing means, (F) said rail members being arranged side by side and between said spaced guide members and supported by said spaced guide members and securing means for reciprocal movement transverse of said control means between a plurality of positions, (G) said control means being slidably movable to a selecting position corresponding to each rail member, (H) and means operatively connecting said control means to one rail member in each selecting position to move one rail member between its plurality of positions when said control means is rotated.

9. In a gear selector mechanism of a character adapted to be secured to a transmission the combination of, (A) support means, (B) control means rotatably and slidably mounted in said support means, (C) a plurality of shift fork members, (D) an independent rail member operatively connected directly to each shift fork member, (E) a pair of spaced guide members, (F) said rail members being arranged side by side and disposed between said spaced guide members, (G) securing means securing said guide members to said support means and securing means and guide members supporting each rail member for reciprocal movement transverse of said control means between a plurality of positions, (H) said control means being slidably movable to a selecting position corresponding to each rail member, (I) means operatively connecting said control means to one rail member in each selecting position to move one rail member between its plurality of positions when said control means is rotated, (J) and holding means on said supporting means and rail members to yieldingly hold said rail members in each of their positions.

10. In a gear slector mechanism of a character adapted to be secured to a transmission the combination of, (A) support means, (B) control means rotatably and slidably mounted in said support means, (C) a plurality of shift fork members, (D) an independent rail member having upper and lower edges operatively connected directly to each shift fork member, (E) a pair of spaced guide members, (F) said rail members being arranged side by side and disposed between said spaced guide members, (G) securing means securing said guide members to said support means and arranged adjacent the upper and lower edges of said rail members, (H) said guide members and securing means being arranged relative to said control means to permit only reciprocal movement of said rail members between a plurality of positions in a direction transverse of said control means, (I) said control means being slidably movable to a selecting position corresponding to each rail member, (J) recesses in said rail members alignable with each other when said rail members are in one of their positions, (K) an interlock member slidably mounted in aligned apertures in said guide members for movement transverse of the direction of movement of said rail members, (L) lever means fixed to said control means extending through an aperture in said interlock members alternately and selectively received in the recesses of said rail members and movable in said aperture in each selecting position to move one rail member between its plurality of positions when said control means is rotated, (M) said lever means being engageable with said interlock member to move said interlock member conjointly with said control means to each selecting position, (N) and locking portion means on said interlock member selectively and slidably receivable in the recesses in said rail members when said rail members are in their said one position and arranged relative to said aperture so as to be received in the recesses of the non-selected rail members to prevent movement of the non-selected rail members.

11. In a gear selector mechanism as defined in claim 10 and (1) said interlock member comprising an elongated member having a channel shaped base portion, (2) said locking portion means being a longitudinal channel shaped center portion centrally located and integrally formed in said base portion, (3) and said aperture being an elongated slot transverse of said elongated member extending through said base portion and longitudinal channel portion.

12. In a gear selector mechanism of a character adapted to be secured to a transmission the combination of, (A) support means, (B) a control rod rotatably and slidably mounted in said support means, (C) a plurality of shift fork members,
(D) an independent rail member having upper and lower edges operatively connected directly to each shift fork member,
(E) a pair of spaced guide members,
(F) said rail members being arranged side by side and disposed between said guide members and prevented from lateral movement,
(G) securing means securing said guide members to each other and to said support means and arranged relative to the upper and lower edges of said rail members to prevent vertical movement of said rail members,
(H) said guide members being arranged relative to said control rod to permit movement of said rail members transverse of said control rod,
(I) each rail member being reciprocally movable between a plurality of positions,
(J) said control rod being slidably movable to a selecting position corresponding to each rail member,
(K) means operatively connecting said control rod to one rail member in each control rod selecting position to move one rail member between its plurality of positions when said control rod is rotated,
(L) locking means,
(M) means operatively connecting said locking means to said control rod to move said locking means conjointly with said control rod to each selecting position,
(N) lock means on each rail member selectively engageable with said locking means in each selecting position to lock the non-selected rail members in one of their positions,
(O) and holding means on said guide members and rail members to yieldingly hold rail members in each of their positions.

13. In a gear selector mechanism of a character adapted to be secured to a transmission the combination of,
(A) support means,
(B) a control rod rotatably and slidably mounted in said support means,
(C) a plurality of shift fork members,
(D) an independent rail member operatively connected directly to each shift fork member,
(E) supporting means supporting each rail member on said support means for reciprocal movement transverse of said control rod between a plurality of positions,
(F) said control rod being slidably movable to a selecting position corresponding to each rail member,
(G) means operatively connecting said control rod to one rail member in each selecting position to move one rail member between its plurality of positions when said control rod is rotated,
(H) first and second abutment means fixed against movement axially of said control rod,
(I) an abutment member having an annular portion slidably received on said control rod and disposed between said first and second abutment means,
(J) first spring means having a high spring force disposed between said first means and abutment member prestressed to urge said abutment member against said second abutment means,
(K) third abutment means fixed to said control rod,
(L) stop means on said supporting means,
(M) second spring means having a low spring force disposed between said abutment member and third abutment means whereby when said control rod is slidably moved in one direction to one selecting position said second spring is effective to provide a low spring force resisting movement of said control rod to said one selecting position,
(N) and said abutment member having an abutment portion arranged relative to said third abutment means such that when said control rod is slidably moved in said one direction to another selecting position said third abutment means contacts the abutment portion of said abutment member whereby said abutment member moves conjointly with said control rod to said another selecting position and said first prestressed spring means is effective to provide a high force abruptly resisting initial movement of said control rod to said another selecting position.

14. In a gear selector mechanism of a character adapted to be secured to a transmission the combination of,
(A) support means having one abutment means,
(B) a plurality of shift fork members,
(C) an independent rail member operatively connected directly to each shift fork member,
(D) supporting means including a pair of spaced guide members supporting each rail member on said support means for reciprocal movement between a plurality of positions,
(E) a control rod transverse of each shift fork means rotatably and slidably mounted in said support means,
(F) said control rod being freely received in an aperture in one guide member and slidably movable between a plurality of selecting positions,
(G) means operatively connecting said control rod to one rail member in each selecting position to move one rail member between its plurality of positions when said control rod is rotated,
(H) an abutment member having an annular flange portion received on said control rod and movable between said one guide member and first abutment means,
(I) a first coil spring having a high spring force received on said control rod abutting at its opposite ends said first abutment means and abutment member and prestressed to urge said abutment member against said one guide member,
(J) another abutment means fixed to said control rod,
(K) a second coil spring having a low spring force received on said control rod abutting at its opposite ends said abutment member and another abutment means effective to provide a low force resisting movement of said control rod in one direction to one selecting position,
(L) and said annular flange portion being arranged relative to said another abutment means such that when said control rod is initially moved in said one direction from said one selecting position to another selecting position said another abutment means contacts said annular flange portion and urges said abutment member against said prestressed first spring means whereby said prestressed first spring means provides a high force abruptly resisting initial movement of said control rod to said another selecting position.

15. In a gear selector mechanism of a character adapted to be secured to a transmission the combination of,
(A) support means including first abutment means,
(B) a control rod rotatably and slidably mounted in said support means,
(C) a plurality of shift fork members including at least three shift fork members,
(D) an independent rail member operatively connected to each shift fork means,
(E) supporting means supporting each rail member on said support means for reciprocal movement transverse of said control rod between a plurality of positions,
(F) said control rod being slidably movable to a selecting position corresponding to each rail member including at least three selecting positions,
(G) means operatively connecting said control rod to one rail member in each control rod selecting position to move one rail member when said control rod is rotated, (H) said supporting means having stop means and second abutment means,
(I) third abutment means fixed to said control rod,
(J) an abutment member having an aperture slidably received on said control rod and movable between said first and second abutment means,
(K) first spring means between said first abutment means and abutment member prestressed to urge said abutment member against said second abutment means,
(L) second spring means having a low spring force between said abutment member and third abutment means prestressed to urge said third abutment against said stop means and yieldingly hold said control rod in said first selecting position,
(M) said second spring means upon movement of said control rod in one direction to said second selecting position being effective to provide a low force resisting movement of said control rod to said second selecting position,
(N) and said abutment member having an abutment poriton arranged relative to said third abutment means such that when said control rod is initially moved in said one direction from said second selecting position to said third selecting position said third abutment means contacts said abutment portion whereby said first spring means is effective to provide a high force abruptly resisting initial movement of said control rod to said third selecting position.

16. In a transmission control the combination of,
(A) support means,
(B) one control rod rotatably and slidably mounted in said support means,
(C) another control rod,
(D) coupling means universally coupling said one and another control rods,
(E) a steering column and a hand lever,
(F) pivot means pivotally connecting said hand lever at a point intermediate its ends to said another control rod for relative movement therebetween about the axis of said pivot means,
(G) means pivotally connecting one end of said hand lever to said steering column,
(H) said another control rod being inclined relative to said steering column and one control rod and said hand lever being movable about its said one end to selectively effect rotatable and slidable movements of said control rods,
(I) shift fork means,
(J) means supporting said shift fork means on said support means for reciprocal movement transverse of said one control rod between a plurality of positions,
(K) said one control rod being slidably movable to a selecting position corresponding to said shift fork means,
(L) and means operatively and selectively connecting said one control rod to said shift fork means in said selecting position to move said shift fork means between its plurality of positions when said one control rod is rotated.

17. In a transmission control the combination of,
(A) support means,
(B) one control rotatably and slidably mounted in said support means,
(C) another control rod,
(D) coupling means universally coupling said one and another control rods,
(E) a steering column and a hand lever,
(F) pivot means pivotally connecting said hand lever to said another control rod for relative movement therebetween about the axis of said pivot means,
(G) universal pivot means pivotally mounting one end of said hand lever on said steering column for universal movement,
(H) said control rods being inclined relative to each other and said hand lever being movable about its said one end to selectively effect rotatable and slidable movement of said control rods,
(I) a plurality of shift fork members,
(J) an independent rail member operatively connected to each shift fork member,
(K) supporting means supporting each rail member on said support means for reciprocal movement transverse of said one control rod between a plurality of positions,
(L) said one control rod being slidably movable to a selecting position corresponding to each rail member,
(M) means operatively connecting said one control rod to one shift fork means in each selecting position to move one rail member between its plurality of positions when said one control rod is rotated,
(N) holding means on said supporting means and each rail member to yieldingly hold each rail member in its plurality of positions,
(O) first and second abutment means fixed against movement axially of said one control rod,
(P) first and second spring means having a high and a low spring force respectively,
(Q) said one control rod having control rod abutment means,
(R) an abutment member disposed between and in abutting relationship with one end of said first and second spring means and said second abutment means,
(S) the other end of said first and second spring means in abutting relationship with said first abutment means and said control rod abutment means respectively,
(T) said first spring means prestressed to urge said abutment member against said second abutment means and said abutment member being arranged relative to said control rod abutment means whereby said second spring means is effective to provide a low force resisting movement of said control rod in one direction to one selecting position and upon further movement in said one direction to another selecting position said control rod means is urged against said abutment member whereby said first spring means is effective to provide an abruptly increased force resisting initial movement of said control rod to said another selecting position.

18. In a transmission control the combination of,
(A) support means,
(B) one control rod rotatably and slidably mounted in said support means,
(C) another control rod.
(D) coupling means universally coupling said one and another control rods,
(E) a steering column and a hand lever,
(F) pivot means pivotally connecting said hand lever to said another control rod for relative movement therebetween about the axis of said pivot means,
(G) universal pivot means pivotally mounting one end of said hand lever on said steering column for universal movement,
(H) said control rods being inclined relative to each other and said hand lever being movable about its one end to selectively effect rotatable and slidable movements of said control rods,
(I) a plurality of shift fork means,
(J) supporting means supporting each shift fork means for reciprocal movement transverse of said one control rod between a plurality of positions,
(K) said one control rod being slidable to a selecting position corresponding to each shift fork means,
(L) lever means operatively connecting said one control rod to one shift fork means in each selecting position to move one shift fork means between its plurality of positions when said one control rod is rotated,
(M) lock means on each shift fork means,
(N) locking means operatively connected to said one control rod by said lever means and conjointly movable with said control rod to each selecting position,
(O) said locking means in each selecting position operable to cooperate with the lock means of the non-selected shift fork means to prevent movement of the non-selected shift fork means,
(P) and holding means on said supporting means and each shift fork means to yieldingly hold each shift fork means in its plurality of positions.

19. In a transmission control as defined in claim 18 and said universal pivot means including a bracket member fixed to said steering column and having a tubular portion, said one end of said hand lever having a ball portion mounted in said tubular portion, spring clip means retained in an aperture in said tubular portion having a retaining portion extending into said tubular portion and spring means mounted in said tubular portion prestressed to yieldingly hold said ball portion against the retaining portion of said spring clip.

20. In a transmission control the combination of,
(A) universal pivot means adapted to be secured to a steering column and having a tubular portion,
(B) a lever having a ball portion fitting within said tubular portion,
(C) a spring clip externally positioned on said tubular portion having a retaining portion extending through an aperture in said tubular portion to retain said clip on said tubular portion and to retain said ball portion in said tubular portion,
(D) and spring means prestressed by yieldingly hold said ball portion against the retaining portion of said clip.

References Cited by the Examiner

UNITED STATES PATENTS

| | | | |
|---|---|---|---|
| 1,467,380 | 9/1923 | Hartmann | 64—18 |
| 2,175,449 | 10/1939 | Stanard | 74—477 |
| 2,252,158 | 8/1941 | Bixby | 74—473 |
| 2,275,779 | 3/1942 | McPherson | 74—477 |
| 2,336,579 | 12/1943 | Venditty et al. | 64—18 |
| 2,428,892 | 10/1947 | Plexico | 74—477 |
| 2,478,356 | 8/1949 | Auten | 74—484 |
| 2,631,467 | 3/1953 | Lincoln et al. | 74—484 |
| 2,748,910 | 6/1956 | Klecker | 74—355 X |

FOREIGN PATENTS 461,065   3/1929   Germany.

MILTON KAUFMAN, *Primary Examiner.*
DON A. WAITE, *Examiner.*
J. D. PUFFER, *Assistant Examiner.*

UNITED STATES PATENT OFFICE
CERTIFICATE OF CORRECTION

Patent No. 3,264,895                                      August 9, 1966

John R. Turunen

It is hereby certified that error appears in the above numbered patent requiring correction and that the said Letters Patent should read as corrected below.

Column 5, line 37, for "imports" read -- imparts --; column 7, line 31, after "controlled" insert -- control --; column 8, line 49, for "movable" read -- mounted --; line 68, for "positions" read -- position --; line 75, for "co-operatively" read -- co-operable --; column 9, line 51, for "member" read -- members --; column 13, line 13, after "abutment" insert -- means --; line 22, for "poriton" read -- portion --; column 16, line 6, for "by" read -- to --.

Signed and sealed this 22nd day of August 1967.

(SEAL)
Attest:

ERNEST W. SWIDER                                      EDWARD J. BRENNER
Attesting Officer                                          Commissioner of Patents